United States Patent
Zhu et al.

(10) Patent No.: US 10,034,194 B2
(45) Date of Patent: Jul. 24, 2018

(54) SYSTEM AND METHOD OF MANAGING WIRELESS COMMUNICATIONS WITH MULTIPLE TRANSMISSION POINTS

(75) Inventors: Yuan Zhu, Beijing (CN); Alexei Davydov, Nizhny Novgorod (RU); Kamran Etemad, Potomac, MD (US); Qinghua Li, San Ramon, CA (US); Xiaogang Chen, Beijing (CN); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 441 days.

(21) Appl. No.: 13/976,464

(22) PCT Filed: Sep. 28, 2011

(86) PCT No.: PCT/US2011/053690
§ 371 (c)(1),
(2), (4) Date: Feb. 24, 2014

(87) PCT Pub. No.: WO2012/148446
PCT Pub. Date: Nov. 1, 2012

(65) Prior Publication Data
US 2014/0355529 A1    Dec. 4, 2014

Related U.S. Application Data

(60) Provisional application No. 61/481,024, filed on Apr. 29, 2011.

(51) Int. Cl.
*H04W 28/02* (2009.01)
*H04N 21/2365* (2011.01)
(Continued)

(52) U.S. Cl.
CPC ...... *H04W 28/0231* (2013.01); *H04B 7/0413* (2013.01); *H04B 7/0417* (2013.01);
(Continued)

(58) Field of Classification Search
CPC ......... H04W 72/0413; H04W 72/0143; H04W 28/0231; H04B 7/0413
See application file for complete search history.

(56) References Cited

U.S. PATENT DOCUMENTS

| 6,735,180 B1 | 5/2004 | Malkamaki et al. |
| 2008/0095106 A1 | 4/2008 | Malladi et al. |

(Continued)

FOREIGN PATENT DOCUMENTS

| CN | 101242384 A | 8/2008 |
| WO | 2006130742 A1 | 12/2006 |

OTHER PUBLICATIONS

TS36.213 ( 3rd Generation Partnership Project; Technical Specification Group Radio Access Network; Evolved Universal Terrestrial Radio Access (E-UTRA); Physical layer procedures (Release 10), V10.1.0, Mar. 2011).*

(Continued)

*Primary Examiner* — Hoon J Chung
*Assistant Examiner* — Zhensheng Zhang

(57) ABSTRACT

An apparatus includes a processor a channel state information (CSI) module operative on the processor to evaluate channel state information for a multiplicity of transmission points and to allocate a selection of channel state information reference signals (CSI-RS) to an uplink sub-frame allotted for transmitting channel quality/precoding matrix index/rank indicator (CQI/PMI/RI) information to a transmission point. The apparatus may further include a wireless transceiver operative to transmit the selection of CSI-RS in the uplink sub-frame to the transmission point in a wireless network, and receive information from the transmission point in response to the CSI-RS and a digital display operative to present the information received from the transmission point.

22 Claims, 12 Drawing Sheets

(51) Int. Cl.

| | | |
|---|---|---|
| *H04N 21/643* | (2011.01) | |
| *H04W 52/02* | (2009.01) | |
| *H04B 7/0456* | (2017.01) | |
| *H04W 72/04* | (2009.01) | |
| *H04W 48/06* | (2009.01) | |
| *H04L 12/803* | (2013.01) | |
| *H04L 12/801* | (2013.01) | |
| *H04L 29/06* | (2006.01) | |
| *H04L 1/18* | (2006.01) | |
| *H04L 5/00* | (2006.01) | |
| *H04J 11/00* | (2006.01) | |
| *H04L 27/26* | (2006.01) | |
| *H04L 1/00* | (2006.01) | |
| *H04B 7/0413* | (2017.01) | |
| *H04B 7/0417* | (2017.01) | |
| *H04W 68/00* | (2009.01) | |
| *H04B 7/0452* | (2017.01) | |
| *H04W 72/12* | (2009.01) | |
| *H04W 12/06* | (2009.01) | |
| *H04W 12/08* | (2009.01) | |
| *H04W 88/02* | (2009.01) | |
| *H04W 4/70* | (2018.01) | |
| *H04W 88/06* | (2009.01) | |
| *H04W 36/14* | (2009.01) | |
| *H04B 7/06* | (2006.01) | |
| *H04W 84/12* | (2009.01) | |
| *H04W 88/10* | (2009.01) | |

(52) U.S. Cl.
CPC ......... *H04B 7/0452* (2013.01); *H04B 7/0482* (2013.01); *H04B 7/0486* (2013.01); *H04J 11/0046* (2013.01); *H04L 1/0032* (2013.01); *H04L 1/1812* (2013.01); *H04L 1/1861* (2013.01); *H04L 5/0025* (2013.01); *H04L 5/0026* (2013.01); *H04L 5/0035* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04L 5/0092* (2013.01); *H04L 5/0094* (2013.01); *H04L 27/2602* (2013.01); *H04L 27/2613* (2013.01); *H04L 47/125* (2013.01); *H04L 47/14* (2013.01); *H04L 63/10* (2013.01); *H04L 65/4076* (2013.01); *H04N 21/2365* (2013.01); *H04N 21/64322* (2013.01); *H04W 4/70* (2018.02); *H04W 12/06* (2013.01); *H04W 12/08* (2013.01); *H04W 28/0268* (2013.01); *H04W 48/06* (2013.01); *H04W 52/0203* (2013.01); *H04W 52/0219* (2013.01); *H04W 68/005* (2013.01); *H04W 72/042* (2013.01); *H04W 72/0406* (2013.01); *H04W 72/0413* (2013.01); *H04W 72/1247* (2013.01); *H04W 88/02* (2013.01); *H04B 7/0465* (2013.01); *H04B 7/0478* (2013.01); *H04B 7/0632* (2013.01); *H04W 36/14* (2013.01); *H04W 84/12* (2013.01); *H04W 88/06* (2013.01); *H04W 88/10* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/168* (2018.01); *Y02D 70/21* (2018.01); *Y02D 70/26* (2018.01); *Y02D 70/444* (2018.01)

(56) References Cited

U.S. PATENT DOCUMENTS

| | | | |
|---|---|---|---|
| 2008/0303699 A1* | 12/2008 | Zhang | H04L 25/0204 341/67 |
| 2009/0010240 A1 | 1/2009 | Papasakellariou et al. | |
| 2010/0322351 A1 | 12/2010 | Tang et al. | |
| 2011/0317748 A1* | 12/2011 | Li | H04B 7/0417 375/219 |
| 2012/0076028 A1* | 3/2012 | Ko | H04L 1/0026 370/252 |
| 2012/0147773 A1* | 6/2012 | Kim | H04L 1/0025 370/252 |
| 2013/0021926 A1* | 1/2013 | Geirhofer | H04L 5/0048 370/252 |
| 2013/0286997 A1* | 10/2013 | Davydov | H04B 7/024 370/329 |
| 2014/0064201 A1* | 3/2014 | Zhu | H04L 5/0094 370/329 |

OTHER PUBLICATIONS

Extended European Search Report received for European Patent Application No. 11864500.1, dated Jul. 13, 2015, 9 pages.
"Node-B controlled fast cell selection in HSDPA", Lucent Technologies, 3GPP TSG-RAN WG1#25, R1-02-0528, Apr. 9-12, 2002, 4 pages (author unknown).
"Aspects on Distributed RRUs with Shared Cell-ID for Heterogeneous Deployments", Ericsson, 3GPP TSG-RAN WG1#64, R1-110649, Feb. 21-25, 2011, 11 pages (author unknown).
"CSI-RS configuration/reconfiguration in distributed RRH systems", Intel Corporation, 3GPP TSG RAN WG1 Meeting #65, R1-111593, May 9-13, 2011, 3 pages (author unknown).
International Search Report and Written Description received for PCT Patent Application No. PCT/US2011/053690, dated Apr. 9, 2012, 11 pages.
"Control Signalling to Support Rel. 10 Feedback Framework", 3GPP TSG-RAN WG1 Meeting #61bis, R1-103667, Jun. 28-Jul. 2, 2010, (Author unknown).
"Remaining Issues on CSI-RS Transmission", 3GPP TSG-RAN WG1, Meeting #62bis, R1-105377, Oct. 1-15, 2010, (Author unknown).
"Further Details on CSI-RS Design for LTE-Advanced", 3GPP TSG-RAN WG1, Meeting #58bis, R1-094171, Oct. 12-16, 2009, (Author unknown).
"Baseline Schemes and Focus of CoMP Studies", 3GPP TSG-RAN WG1, Meeting #63bis, R1-110461, Jan. 17-Jan. 21, 2011, (Author unknown).
Office Action received for Chinese Patent Application No. 201180070501.1, dated Jan. 3, 2018, 10 pages (untranslated).

\* cited by examiner

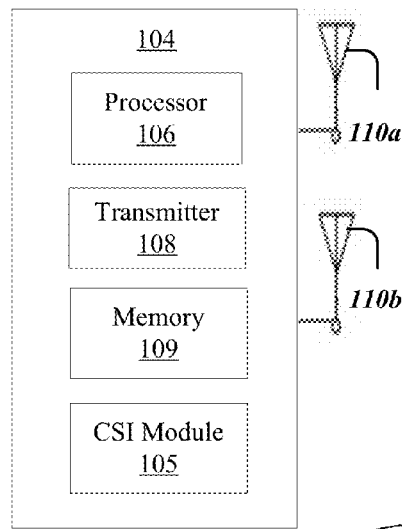
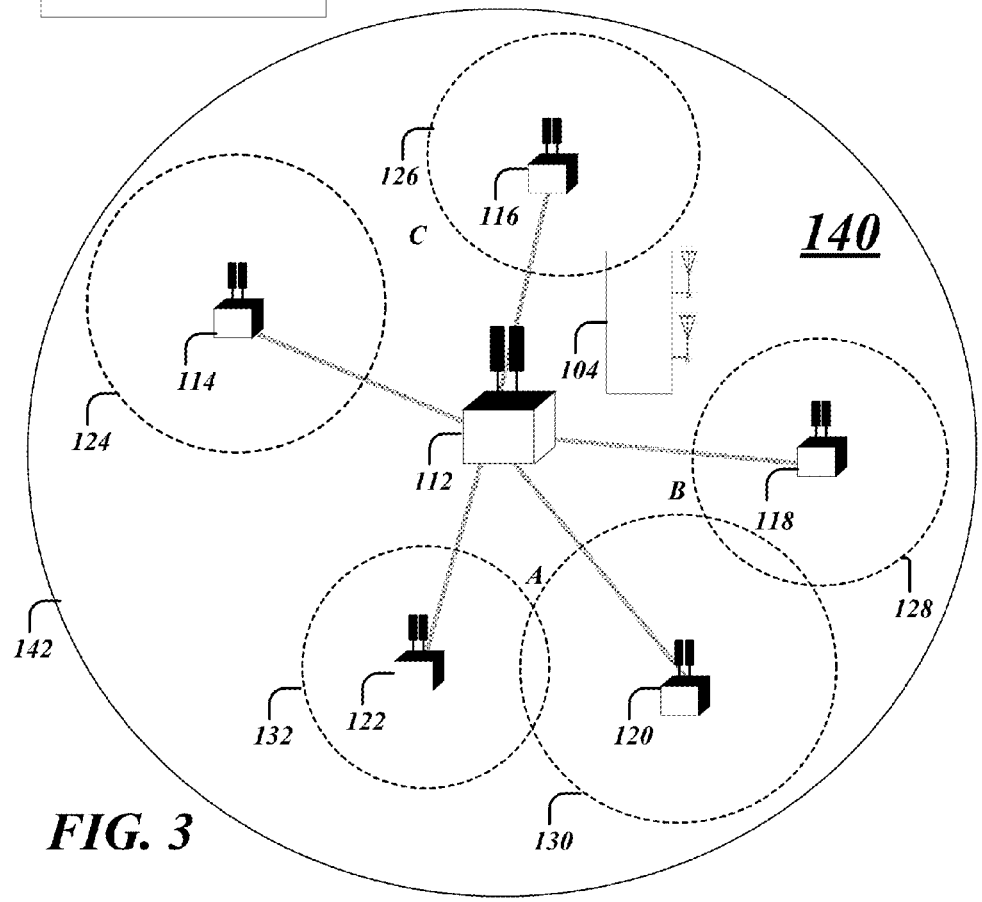
*FIG. 2*
*FIG. 3*

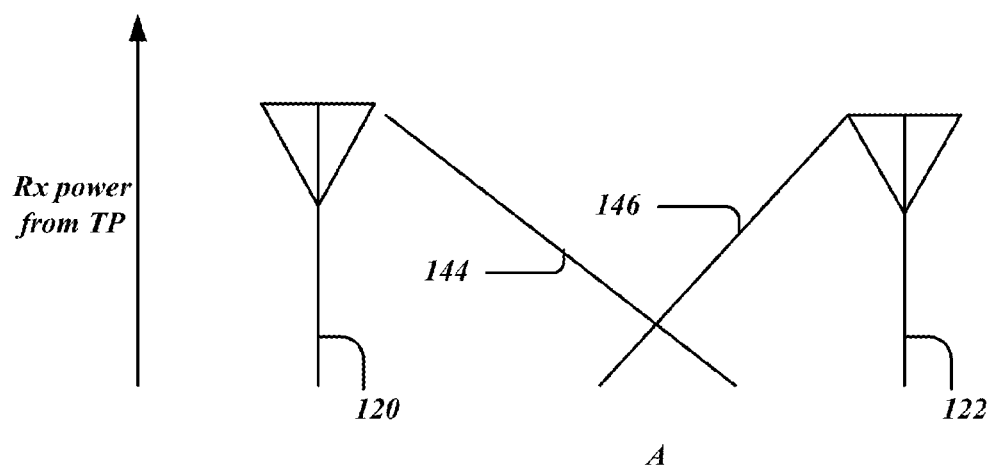
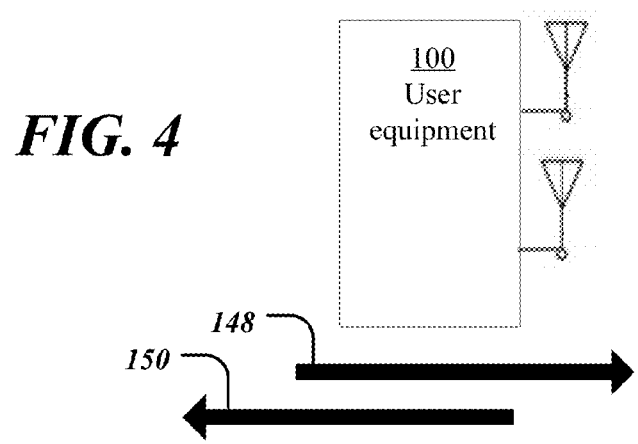
FIG. 4

| PUCCH format | Modulation scheme | Number of bits per subframe | Type of control information |
|---|---|---|---|
| 2 | QPSK | 20 | Channel status reports |
| 2a | QPSK + BPSK | 21 | Channel status reports and HARQ-ACK (1-bit) |
| 2b | QPSK + BPSK | 22 | Channel status reports and HARQ-ACK (2-bit) |

*FIG. 5a*
(PRIOR ART)

| PUCCH format | Modulation scheme | Number of bits per subframe | Type of control information |
|---|---|---|---|
| 2 | QPSK | 20 | Channel status reports |
| 2a | QPSK + BPSK | 21 | Channel status reports and HARQ-ACK (1-bit) |
| 2b | QPSK + BPSK | 22 | Channel status reports, HARQ-ACK (2-bit), and CSI-RS reports |

*FIG. 5b*

| PUCCH Reporting Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 7 | RI/CSI-RS | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

*FIG. 7*

SYSTEM AND METHOD OF MANAGING WIRELESS COMMUNICATIONS WITH MULTIPLE TRANSMISSION POINTS

This application claims priority to U.S. provisional patent application Ser. No. 61/481,024, filed Apr. 29, 2011, and incorporated by reference herein in its entirety.

BACKGROUND

Managing communications between a mobile user employing a wireless user equipment device (UE) and wireless base stations continues to be a challenge in part due to the mobility of the UE. Standards for wireless technologies including 3GPP LTE are continually evolving in order to address needs for higher data transmission efficiency and spectrum utilization efficiency, in particular in the context of a mobile UE.

In one example, in order to further improve the rate of an edge user and the overall performance of a system, the coordinated multipoint transmission (CoMP) technology has been widely considered by the third generation partner project (3GPP) for incorporation into the architecture of standards, such as LTE-A (see 3GPP TS 36.213, Technical Specification Release 10, June 2011, 3rd generation Partnership Project). CoMP, which was designed to facilitate communications with edge users, involves coordinated transmission and reception of data for one or more users through geographically separate transmission points (TP), thereby improving the transmission efficiency and performance at the edge of a cell. The architecture of CoMP differs from a network architecture treated in previous LTE releases in that there are a plurality of geographically separate transmission points serving a user in the CoMP architecture, as compared to a traditional cellular network architecture of LTE (release 8a) where a central or edge user is served only by a cell where the central or edge user is located. In the traditional architecture, only a base station (also designated as evolved NodeB, or eNodeB) serving the user receives uplink data of the user in the uplink path, while in the CoMP architecture, multiple transmission points receive the uplink data from the user during uplink transmission.

In CoMP, among coordinated transmission cells, the cells serving concurrently an individual UE form a cooperating set including a primary cell responsible for tasks of resource scheduling and allocation, coordinated data processing, etc., and one or more cooperative cells responsible for only the process of transmitting and receiving data.

In particular, several scenarios have been developed for possible implementation of CoMP in LTE standards. Among these are scenario 4, in which a heterogeneous network includes low power remote radio heads (RRH) within a macrocell coverage, and where the transmission/reception points created by the RRHs have a same cell ID as the macro cell. In the scenario 3, on the other hand, the transmission/reception points created by the low power RRHs have a different cell ID from the macro cell. In the scenario 4, both the macro cell and its associated RRHs can act as transmission/reception points of a cell and are visible to the UE through the use of channel state information reference signals (or reference symbols) (CSI-RS).

The use of CSI-RS may especially aid MIMO transmissions in a CoMP architecture where each UE may need to estimate channel state information of multiple TPs. The CSI-RS constitute cell specific pilot symbols provided by an eNB that allow each UE to estimate CSI in the multi-TP CoMP environment independent from that used for pre-coding. Accordingly, the CSI-RSs were introduced in LTE release 10 to facilitate a given UE acquiring channel state information (CSI) in such MIMO environments. The reported CSI generally includes channel quality indicator (CQI), precoding matrix indicator (PMI), and/or rank indicator (RI) information. In particular, in a CoMP communications scheme, a UE may measure CSI-RSs transmitted from adjacent transmission points when the UE is located at a cell edge.

The eNodeB (or eNB) can configure a given UE to report CSI for the most suitable transmission/reception point (hereinafter simply referred to as a transmission point or "TP") through radio resource control (RRC) configuration/reconfiguration. In a CoMP scenario in which the eNB is to configure only one CSI report instance for one UE, the UE may report CSI for one or more TPs. This may consist of one CSI-RS pattern and may maximize certain performance matrices, such as the UE's throughput. Thus, when a UE is mobile within a given cell, RRC reconfiguration may be desirable if the TP(s) for which the UE is currently reporting channel quality information (CQI) are no longer the best TP(s) for serving the UE.

It is with respect to these and other considerations that the present improvements have been needed.

BRIEF DESCRIPTION OF THE DRAWINGS

FIG. 2 depicts a UE arranged in accordance with various embodiments.

FIG. 3 depicts an embodiment of a wireless communications system arranged in an architecture compatible with CoMP transmission.

FIG. 4 depicts a scenario in which a UE is mobile between multiple transmission points.

FIGS. 5a and 5b provide respective depictions of a known LTE PUCCH format structure and a format structure arranged according to present embodiments.

FIG. 7 provides one embodiment of an uplink report structure.

DETAILED DESCRIPTION

Figure 1:
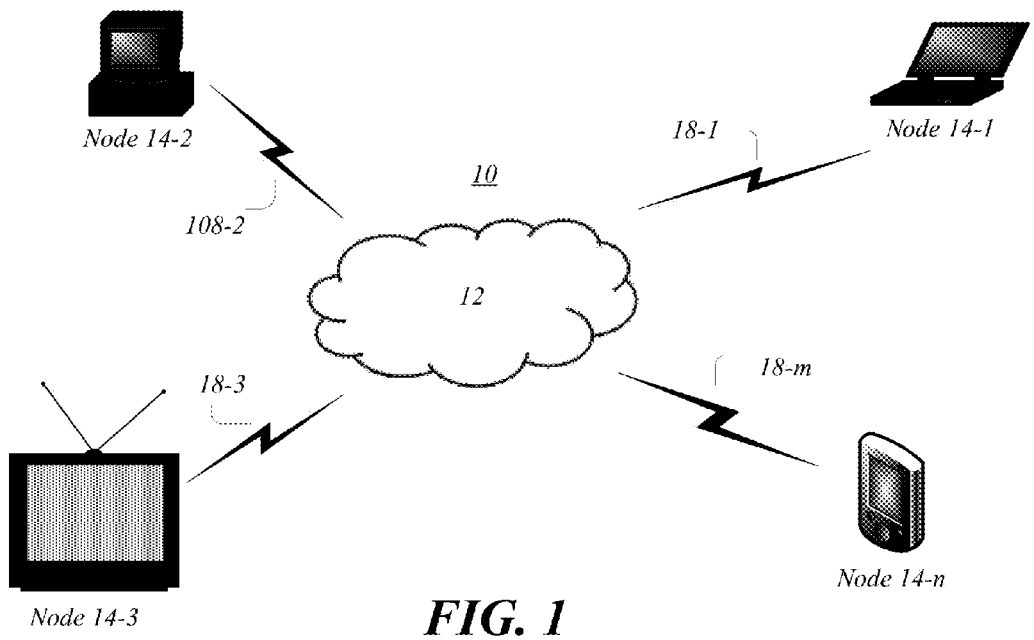
FIG. 1 illustrates a block diagram of one embodiment of a communications system.

Various embodiments may be generally directed to systems that employ wireless communications using multiple transmission points to communicate with a wireless device. Some embodiments may be particularly directed to apparatus and methods for channel state information-reference signal transmission in wireless devices.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In one embodiment, a method comprises transmitting from a user equipment device (UE) over a control channel a channel status report comprising channel quality/precoding matrix index/rank indicator (CQI/PMI/RI) information during a first portion of a first uplink sub-frame, determining that no acknowledgment message is to be transmitted in the first uplink sub-frame, and transmitting a first selection of channel state information reference signal (CSI-RS) from the UE to one or more transmission (TP) points in a wireless network over the control channel during a second portion of the uplink sub-frame, the second portion being reserved for transmitting an acknowledgment message in response to a downlink transmission.

The method may further involve determining that an acknowledgment message is scheduled for transmission during a second uplink sub-frame and transmitting the selection of CSI-RS in the second portion of a third uplink sub-frame in which no acknowledgment message is scheduled.

The method may also involve transmitting the selection of CSI-RS in a symbol of the first sub-frame, the first sub-frame being arranged to transmit an acknowledgment message in response to a hybrid automatic repeat request (HARQ) transmission, which, in one implementation, may include arranging transmissions in the first uplink sub-frame according to a format that provides the channels status reports within twenty of twenty two allocated bits of the first uplink sub-frame and transmitting the selection of CSI-RS in an $11^{th}$ symbol of the first uplink sub-frame.

The method may also include arranging the selection of CSI-RS to be sent periodically, wherein a CSI-RS period has a same duration as that of a rank indicator (RI) period for transmitting rank indicator information from the UE to the one or more transmission points, which, in a first implementation, may involve arranging the selection of CSI-RS to be sent multiple times within a CSI-RS period, while in a second implementation may involve providing an offset between the CSI-RS period and RI period. One variant of the second implementation may include providing a first selection of CSI-RS in a first CSI-RS period that overlaps a first RI period and applying the first selection of CSI-RS to communications in a second RI period subsequent to the first RI period.

FIG. 1 illustrates a block diagram of one embodiment of a communications system 10. As shown in FIG. 1, the communications system 10 may comprise a network 12 that communicates over links 18-*m* with a plurality of nodes 14-*n*, where m and n may represent any positive integer value. In various embodiments, the nodes 14-*n* may be implemented as various types of wireless devices. Examples of wireless devices (also referred to herein as UE) may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, a multiplicity of devices in communications system 10 may employ multiple input and multiple output (MIMO) communications in which both receiver and transmitter employ multiple antennae. Some embodiments of a communications system may be implemented with a radio technology such as IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. LTE-advance (LTE-A) is an evolution of the 3GPP LTE.

For clarity, the following description may focus on embodiments related to LTE-A, and in particular, to CoMP scenarios. However, other embodiments may employ other standards, as noted above and/or generally known to those of skill in the art.

In many scenarios where a UE is mobile, the signal strength from different TPs within wireless communications range of the UE may fluctuate rapidly, such that the best TP to serve a given UE may frequently change. In various technologies, schemes have defined or proposed to address scheduling of transmissions between a UE and multiple transmission points. In order to support dynamic scheduling and multiple input multiple output (MIMO) transmission in a downlink (DL) communication sent to a UE, several control signals are required to be fed back in an uplink (UL) communication. For example, MIMO related feedback includes an index of a selected precoding matrix (PMI), a transmission rank index (RI), which refers to the number of spatial layers, and supportable modulation and coding schemes (MCS), the latter of which may be generally referred to as channel quality indicators (CQI).

Channel state information reference signals (CSI-RS) are generally designed to be used by terminals to acquire channel state information (CSI). In various embodiments, apparatus, methods, and architecture related to so-called fast CSI-RS selection are disclosed. FIG. 2 depicts a UE 104 arranged in accordance with various embodiments. The UE includes a processor 106, transmitter, 108, and one or more antennae 110. The UE 104 further includes a channel state information module 105 that may be operative on the processor 106 to perform various functions related to CSI-RS selection, such as CSI evaluation and CSI-RS selection, some of which are discussed below with respect to FIGS. 5-10 in particular. FIG. 3 depicts an embodiment of a wireless communications system 140 arranged in an architecture compatible with CoMP transmission. While UE 104 is located within a region (macro cell) 142 defined by eNB 112 of wireless communications system 140, the UE 104 may link to any of transmission points (TP) 112, 114, 116, 118, 120, and 122. In particular, transmission points 114-122 may be remote radio heads (RRH) that are coupled to eNB 112 wirelessly or through links such as a fiber optic links. In RRH embodiments, each RRH 114, 116, 118, 120, and 122 may be a relatively lower power radio transmitter defining respective pico cells 124, 126, 128, 130, 132 that are much smaller than macro cell 122. When UE 104 is located within macro cell 122, UE 104 may move to different locations such that the relative signal strength from the different RRHs and eNB varies. In embodiments of CoMP transmission, eNodeB 112 and RRHs 114-122 may all present the same cell ID to the UE 104, consistent with scenario 4 of LTE-A. As UE 104 moves between different locations in macro cell 122, eNB 112 can send downlink messages to configure UE 104 to report CSI for different TPs. In particular, UE 104 may report CSI for one or more TPs, which may comprise a single CSI-RS pattern at a given reporting instance. For example, when UE is at point A, CSI may be reported for RRHs 120, 122, and eNB 112; while UE is at point B CSI may be reported for RRHs 120, 118, and eNB 112; while UE is at point C CSI may be reported for RRHs 114, 116, and eNB 112.

FIG. 4 depicts a scenario in which UE 104 is located at point A and traveling generally in the direction 148 towards RRH 122. As illustrated, the received power (Rx) 144 from RRH 120 declines as UE 104 continues toward RRH 122, while the received power 146 from RRH 122 increases. If UE 104 subsequently moves in direction 150, the received power 146 from RRH 122 decreases and the received power 144 from RRH 120 increases. In various embodiments, fast CSI-RS selection may be performed in a manner that provides for rapid CSI-RS reconfiguration, in order to facilitate use of an optimum set of TPs for communications with UE 104 in a CoMP transmission scheme.

In accordance with various embodiments, the UE may be arranged to transmit the CSI-RS in a designated portion of an uplink control channel, such as a physical uplink control channel (PUCCH). In some embodiments, the CSI-RS information may be provided in a portion of an uplink sub-frame generally reserved for reporting other control information. In particular embodiments, the CSI-RS may be scheduled in an uplink sub-frame generally allotted for transmission of CQI/PMI/RI reports as detailed below.

In some embodiments, the scheduling of CSI-RS reports within a desired uplink sub-frame may be accomplished by modifying formats that are used for transmitting control information. The known LTE release 8 standard has defined various formats to be supported by the physical uplink control channel for transmitting various types of control information. FIGS. 5a and 5b provide respective depictions of a known LTE PUCCH format structure 160 and a format structure 170 that is arranged according to present embodiments. In FIG. 5a, three different PUCCH formats 162 are defined. Each format corresponds to a modulation scheme 164, a quantity of bits 166 allotted per sub-frame, and a specified set of control information types 168 that are supported by the format. For example, PUCCH format 2 supports quadrature phase shift keying (QPSK) and provides for 20 bits per sub-frame to be transmitted. The only type of control information supported is channel status reports. The channel status reports include CQI, PMI, and RI information. The PUCCH format 2a supports binary phase shift keying (BPSK) in addition to QPSK and provides for 21 bits per sub-frame. In format 2a one bit is reserved for transmission of a hybrid automatic repeat request acknowledgement (HARQ-ACK) message. Thus, when a transmission from a transmission point is received by the UE over a downlink, if the UE is operating according to PUCCH format 2a, the CQI/PMI/RI information may be sent in the appropriate sub-frame using 20 bits, while a HARQ-ACK message is sent using the "extra" $21^{st}$ bit provided for by format 2a. As further illustrated in FIG. 5a, according to PUCCH format 2b, which also supports QPSK and BPSK, 22 bits are allotted to a sub-frame. The first 20 bits may also be allotted to CQI/PMI/RI information while the extra $21^{st}$ and 22cd bits, which may correspond to the $11^{th}$ symbol, are allotted to a HARQ-ACK message.

Turning now to FIG. 5b, the format structure 170 according to the present embodiments is similar to that specified by the known PUCCH formats 2, 2a, and 2b of format structure 160 of FIG. 5a. However, the field 178 for control information type differs in format 2b from that specified in the format structure 160. In particular, in addition to supporting CQI/PMI/RI (channels status reports) transmission and HARQ-ACK transmission, the modified format 2b of the present embodiments supports CSI-RS signalling in the same sub-frame as used for the channel status reports and HARQ-ACK.

Thus, in various embodiments in which a UE signals PUCCH control information using the format structure 170, either a HARQ-ACK message or a CSI-RS signalling may be transmitted in the two bits of the total of 22 bits allocated in a given sub-frame for channel status reports and HARQ-ACK/CSI-RS. In some embodiments that employ the format structure 170, the timing of sending CSI-RS may be arranged to avoid collisions between the CSI-RS signalling and a HARQ-ACK response. For example, the scheduler, such as eNB 112, may assign a lower priority to CSI-RS signalling than to the HARQ-ACK response. This may help preserve the appropriate timing of a HARQ-ACK message sent on the PUCCH in response to a downlink transmission from a transmission point 112-122. For example, 3GPP (LTE) technical specification 36.213 V10.2.0 specifies the timing relationships for HARQ-ACK messages for different frame structures. In one example, a HARQ-ACK message over PUCCH may be required to be sent in a fourth sub-frame (corresponding to 4 millliseconds in some frame structures) following receipt of a downlink transmission. Thus, if a downlink transmission is scheduled at sub-frame i, the HARQ-ACK message in response to the downlink transmission may be scheduled for sub-frame i+4. In such cases, the UE may assign a lower priority to the CSI-RS signalling selection. The UE may proceed to transmit HARQ-ACK in the predetermined sub-frame (i+4) using the appropriate bits of the sub-frame, such as the 11th symbol. The UE may also transmit the CQI/PMI/RI information using 20 bits allocated to channel status reports (CSR). Because lower priority is assigned to the transmission CSI-RS signalling selection, and because no allocated bits remain for transmission in the sub-frame i+4, the CSI-RS signalling selection is not sent. However, when no HARQ-ACK is scheduled for transmission in the CSR/HARQ-ACK/CSI-RS sub-frame, the UE may transmit the CSI-RS in that sub-frame, together with any CSR.

Referring again to FIG. 3, the embodiment of FIG. 5b facilitates rapid switching of transmission points 112-122 used to communicate in a CoMP scheme, which may be particularly advantageous as a UE 104 moves throughout the macro cell 142, in particular, along a cell edge, such as in regions A, B, or C. As the UE 104 moves in cell edge regions, the choice of best TP(s) for serving UE 104 may fluctuate rapidly. However, the format structure 170 provides for CSI-RS signalling selection to be transmitted with every sub-frame that can report CSR, which may correspond to a frequency as high as every 2 milliseconds in the case of radio frames employing standard 1 millisecond sub-frames. Thus, in various embodiments the most appropriate TP(s) 112-122 for serving UE 104 may be reconfigured up to every 2 milliseconds, resulting in superior performance. In addition, because the CSI-RS signalling selection is transmitted in the sub-frame portion allocated for HARQ-ACK, the transmission is much more robust. Moreover, by prioritizing HARQ-ACK responses over scheduling of CSI-RS, preexisting HARQ-ACK procedures are not perturbed.

In some embodiments, the period for reporting CSI-RS selection signalling may be adjusted according to the period for reporting rank indicator (RI) information. The rank indicator specifies the number of spatially multiplexed streams (layers) that are selected for transmission by the UE. In various embodiments, the rank indicator may be scheduled by an eNB in a periodic fashion. In some embodiments, the rank indicator period may be the same as that of the period for providing CQI/PMI reports. In other embodiments, the rank indicator period may be different from the period used for providing CQI/PMI reports. In specific embodiments, the CSI-RS selection signalling period may be set to be the same as the rank indicator period. However, in some embodiments, an offset between the rank indicator period and the CSI-RS selection signalling period (or CSI-RS period) may be provided. This may increase the robustness of the CSI-RS selection signalling process.

Figure 6A:
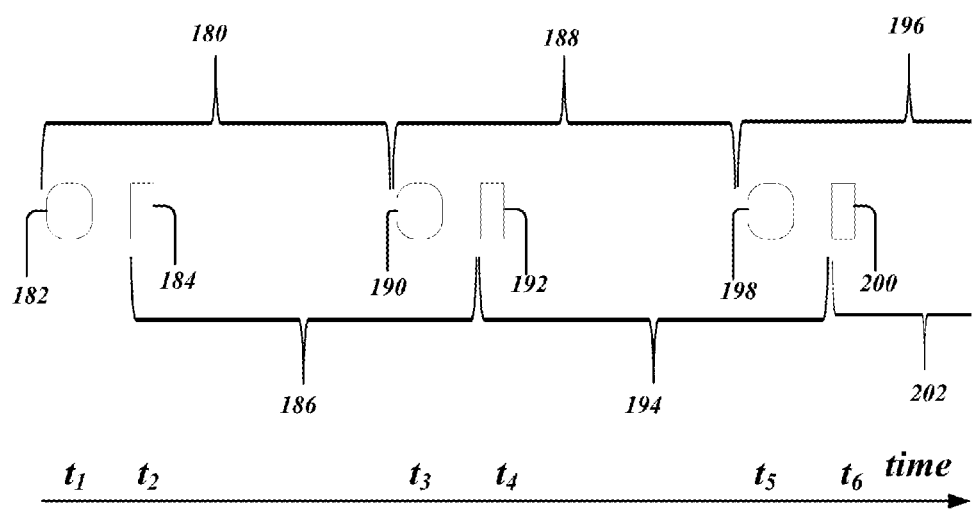
FIG. 6a depicts one embodiment of architecture for control information reporting.

FIG. 6a depicts one embodiment of architecture for control information reporting in which the CSI-RS period and RI period are staggered in time. Illustrated in FIG. 6a are a series of sequential CSI-RS periods 180, 188, and 196, each having a same duration. In CSI-RS period 180, a first CQI/PMI message 182 is provided at time $t_1$, which may correspond to a specific uplink sub-frame in which an CSI-RS selection signalling message is permitted. At a later time $t_2$, an RI report 214 is provided (a CSI-RS report may also be provided at time $t_2$), which may be a different uplink sub-frame that marks the beginning of an RI period 186. In the illustration of FIG. 6a, the RI period 186 is the same duration as CSI-RS periods 180, 188, and 196. At time $t_3$, which marks the beginning of a subsequent CSI-RS period 188, a second CQI/PMI message 190 together with a permissible CSI-RS selection signalling message may be transmitted. At a later time $t_4$ that marks the beginning of a next RI period 194, an RI message 192 is transmitted, which may also be accompanied by a CSI-RS selection signalling message. Finally, at time $t_5$, which marks the beginning of a subsequent CSI-RS period 196, a third CQI/PMI message 198 together with a further CSI-RS selection signalling message may be transmitted, while at a later time $t_6$ that marks the beginning of a next RI period 202, an RI message 200 is transmitted, again with a possible CSI-RS selection signalling message, to the extent that to HARQ-ACK reply message is to be transmitted.

By providing a stagger between CSI-RS periods 180, 188 and 196 on the one hand, and RI periods 186, 194, and 202 on the other hand, a more robust CSI-RS selection signalling process is facilitated by providing higher reliability in the CSI-RS selection signalling. In particular, when operating in a periodical CSI reporting mode, an eNB needs to collect CSI information from multiple CSI reports to provide full CSI information to a scheduler. As an example, when operating under PUCCH format 1, the eNB requires a minimum of one RI report and one CQI/PMI report to recover the complete CSI information measured by the UE. Moreover, it is desirable that the CSI-RS indication be provided in a more robust manner than the RI, because an error in the CSI-RS can cause the eNB to send the data of a particular UE from a mismatched transmission point with the wrong PMI/CQI/RI. If an offset in time is not provided between CSI-RS indication report period and the RI report period, an eNB will have received fewer CSI-RS indication signalling messages when the eNB starts to schedule the UE using the most recently reported RI (and first CQI/PMI).

Figure 6B:
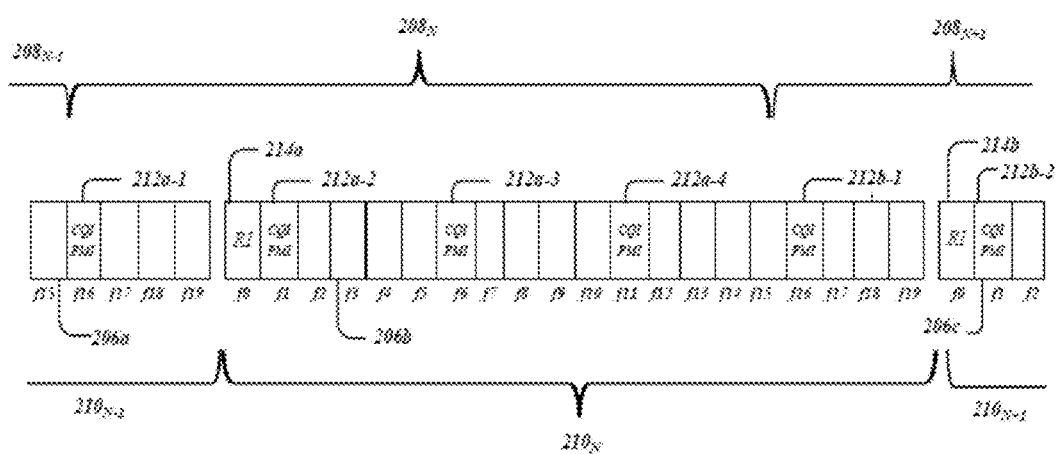
FIG. 6b depicts another embodiment of architecture for control information reporting.

FIG. 6b depicts another embodiment of architecture for control information reporting in which multiple copies of a CSI-RS indication signalling report are sent within a single CSI-RS period. As illustrated, the CSI-RS periods 208 are staggered with respect to RI periods 210. In particular, FIG. 6b illustrates one full CSI-RS period $208_N$ and portions of immediately preceding CSI-RS period $208_{N-1}$ and immediately subsequent CSI-RS period $208_{N+1}$. FIG. 6b also shows one full RI period $210_N$ and portions of immediately preceding RI period $210_{N-1}$ and immediately subsequent RI period $210_{N+1}$. FIG. 6b further depicts radio frames 206a, 206b, and 206c, which are used to transmit the CSI-RS indication signalling and PMI/CQI/RI reports. In particular, FIG. 6b depicts portions of radio frames 206a, 206c, and depicts the full frame 206b, which includes 20 sub-frames (labelled f0-f19). As illustrated, CSI-RS period $208_N$ begins at a time corresponding to sub-frame f 16 of radio frame 206a and extends through a total of 20 sub-frames through sub-frame f15 of radio frame 206b. RI period $210_N$ has the same duration as CSI-RS period $208_N$ but coincides with radio frame 206b, and accordingly begins at frame f0 of radio frame 206b, when RI report 214a is transmitted. Similarly, RI period $210_{N+1}$ begins at frame f0 of radio frame 206c, when RI report 214b is transmitted.

During CSI-RS period $208_N$ four separate CQI/PMI reports 212a-1 to 212a-4 may be transmitted at respective sub-frames 206a, f16; 206b, f1; 206b, f6; and 206b, f11. During each of these reports, a copy of a first CSI-RS selection signalling report may be provided and a further copy of the CSI-RS selection signalling may accompany the RI report 214a provided at sub-frame f0 of radio frame 206b. Thus, if no HARQ-ACK is scheduled in CSI-RS period $208_N$ up to five copies of a first CSI-RS selection signalling report may be transmitted.

In a subsequent CSI-RS period $208_{N+1}$ CQI/PMI reports 212b-1 and 212b-2 may be transmitted at respective sub-frames 206b, f16 and 206c, f1. In the CSI-RS period $208_{N+1}$ a first and second copy of a new CSI-RS selection signalling report may be also transmitted within the sub-frames 206b, f16 and 206c, f1. Thus, because of the offset between CSI-RS periods 208 and RI periods 210 provided by the architecture of FIG. 6b, up to five copies of a CSI-RS may be received by and eNB when the eNB begins scheduling the transmitting UE using its most recently received RI report.

In various other embodiments, a UE, such as UE 104 may be arranged to supply a CSI-RS report using the precoding matrix indicator (PMI) report. According to various LTE standards, precoding feedback is used for channel dependent codebook based precoding, and relies upon the PMI reported by a UE. The PMI is reported to indicate the preferred precoding matrix for transmissions on the downlink, such as the physical downlink shared channel (PDSCH). The precoding matrix in a MIMO system including a CoMP architecture may be used to determine how individual data streams (layers) are mapped to the different antennae. By appropriate selection of a precoding matrix, a maximum number of data bits may be yielded, which the UE can receive in aggregate across all the layers. In practice, this may require knowledge of the channel quality for each antenna used in the downlink transmission, which may be determined by measurements performed by the UE. If the UE is linked to a codebook containing the set of allowed precoding matrices, the UE can then send a PMI report to the eNB which contains a suggestion for a most suitable matrix. For example, the UE 100 may contain codebook in memory 109. The reporting of the PMI may take place periodically as discussed above.

In various embodiments, the codebook used to determine PMI selection may be expanded to accommodate CSI-RS selection signalling. In one example CSI-RS selection code words may be added to a codebook arranged to determine PMI selection. In this manner, the UE can implement fast CSI-RS selection as a PMI search algorithm using the expanded precoding matrix/channel state information reference signal (PMI/CSI-RS) codebook. In one embodiment, a vector, such as a non-constant modulus vector, may be added to a conventional PMI codebook to create an expanded codebook. In a conventional PMI codebook arrangement, a UE can search through all possible pre-codes in a codebook in order to select one that maximizes efficiency. However, implicit is this search process is that the transmitters (Tx) are co-located so that any large scale fading is identical in all transmitters. Accordingly, the vectors arranged in a conventional codebook do not need to account for transmitters that are not co-located. In a CoMP architecture, however, such an assumption is not valid. As illustrated in FIG. 3, for example, when the UE 104 is located at point B, the UE 104 may experience different fading from TPs 112, 118, and 120. In one example, a vector $[1 1 0 0]^T$ may be added to a rank 1 4×1 codebook. In this manner, selection from the expanded vectors of the expanded PMI/CSI-RS codebook may allow a UE to provide the fast CSI-RS selection signalling using a PMI bit transmitted during the sub-frame allotted for PMI transmission. The transmitted PMI bit may indicate to the eNB how to reconfigure serving TPs from multiple TPs in a CoMP architecture.

In some embodiments, the above solution may be only implemented when the total number of transmitting antennae in communication with the UE are 2, 4 or 8, due to constraints placed upon the MIMO operation by the LTE standard. Accordingly, in various embodiments, the UE may schedule the TPs to serve the UE using a combination of criteria including the total number of transmitters for different configurations and the best combination of TPs for serving the UE based upon the search of the expanded codebook. In one specific example of 4 total antennae, the two best TPs may be selected if each has two transmitters.

In various other embodiments, the processor may arrange the CSI-RS to be reported with a rank indicator (RI), which specifies the number of spatially multiplexed streams (layers) selected by the UE for transmission. Referring also to FIG. 3, using spatial multiplexing, eNB 112 may schedule multiple data streams (layers) for transmission to UE 104 in a downlink transmission over the same frequency band. UE 104, in turn, may estimate the downlink channel (not shown) and report a recommended number of layers, that is, the RI, to eNB 112. The scheduling of RI reports may be controlled according to the eNB in various embodiments. In one embodiment, the RI and CSI-RS may be provided in a single report that is formatted to support both RI and CSI-RS reporting. FIG. 7 provides one embodiment of an uplink report structure 250, which defines a single PUCCH reporting type 252. The report type is denoted as "7" consistent with LTE release 10, which defines a set of report types 1, 1a, 2, 2a, 3, 4, 5, and 6. The previously defined report types in LTE release 10 include various combinations of CQI, PMI, PTI, and RI reports. In the present embodiment, the field 254 designates the parameters provided in the type 7 report and indicates that CSI-RS and RI are reported. However, in other embodiments, other parameters may be reported. The mode state 256 field presents three different mode states each having 8 antenna ports and varying among themselves as to whether 2, 4, or 8 layer spatial multiplexing is performed. However, other mode states are possible.

Similarly, the PUCCH reporting mode 258 is merely exemplary. One advantage of providing CSI-RS and RI in a type 7 report is that no alterations to existing report types need be performed. Another advantage of reporting the CSI-RS together with rank indicator is that the signaling of CSI-RS selection becomes more robust. The CSI-RS selection signaling is thus provided with every RI reporting, which may be scheduled frequently in some embodiments.

Included herein is a set of flow charts representative of exemplary methodologies for performing novel aspects of the disclosed communications architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
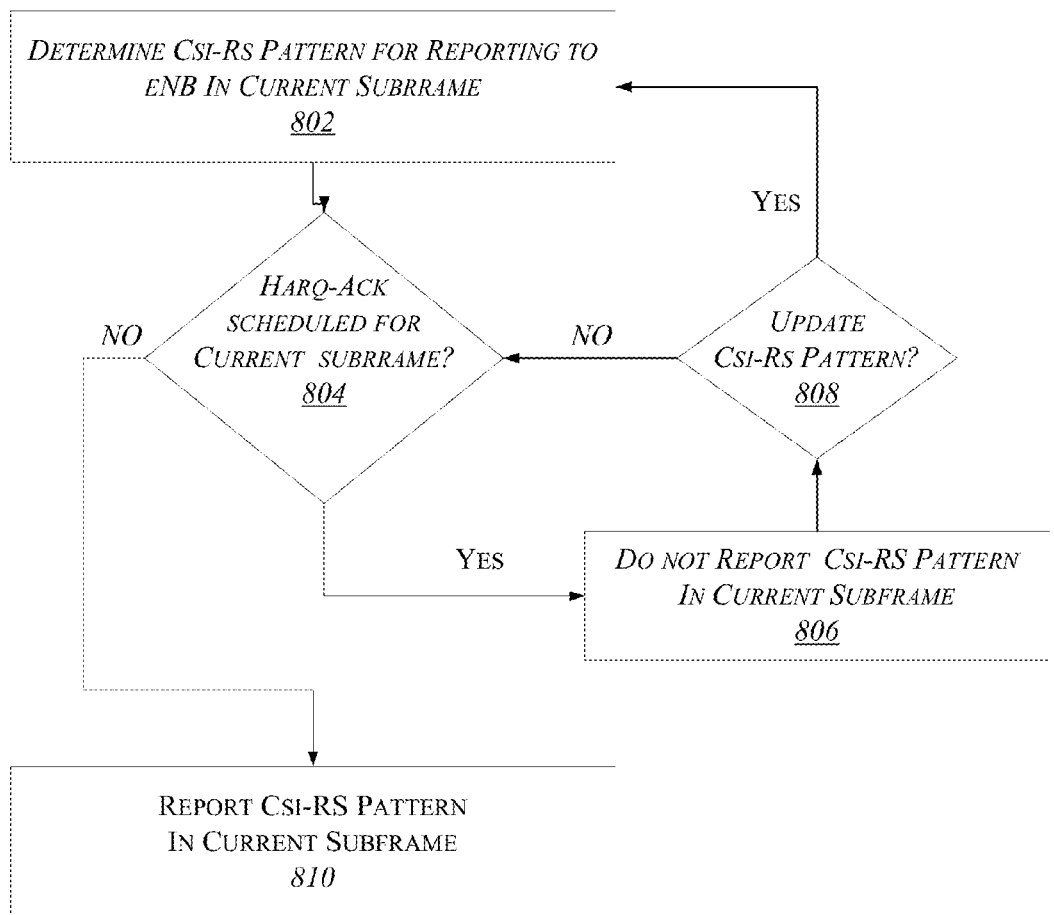
FIG. 8 depicts one embodiment of a logic flow.

FIG. 8 depicts one embodiment of a logic flow 800 which may be implemented in a UE as generally described above. At block 802, a CSI-RS pattern is determined. The CSI-RS pattern may be based upon multiple TPs as described above and may be scheduled for reporting in a first sub-frame. In some embodiments, the CSI-RS may be scheduled for reporting in a symbol position of a sub-frame that may be shared among different sub-frames for reporting either the CSI-RS selection signaling or other control information, such as a HARQ-ACK message. At block 804, if a HARQ-ACK message is scheduled for the current sub-frame, which may correspond to the first sub-frame, the logic moves to block 806, where the CSI-RS pattern is not reported in the current sub-frame. This may avoid a collision between CSI-RS and HARQ-ACK reports. The flow then moves to block 808, where it is determined as to whether to update the CSI-RS pattern. If the CSI-RS pattern is not to be updated, the flow moves back to block 804. If the CSI-RS pattern is to be updated the flow moves to block 802. Subsequently, an updated CSI-RS pattern may be provided at step 810 when no HARQ-ACK is scheduled for the now current sub-frame.

Figure 9:
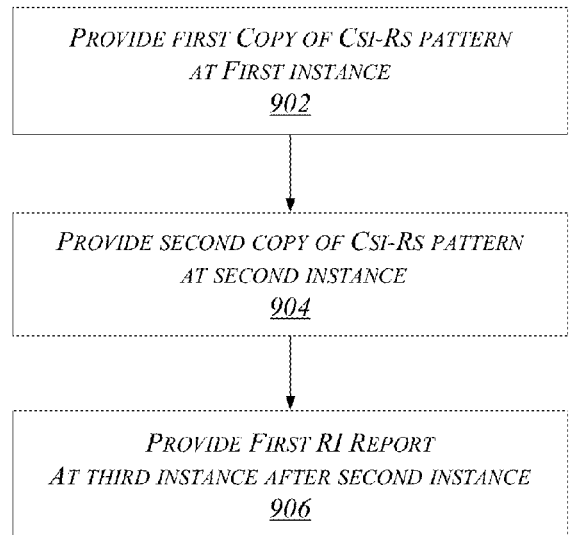
FIG. 9 depicts another embodiment of a logic flow.

FIG. 9 depicts another embodiment of a logic flow 900. At block 902 a first copy of a CSI-RS pattern is provided at a first instance. The CSI-RS pattern may correspond to a set of PMI/CQI/RI information for a UE operating in a given CoMP environment having multiple TPs. At block 904 a second copy of the CSI-RS pattern is provided at a second instance. At block 906 a rank indicator report is provided at a third instance which takes place after the second instance. In this manner when a new RI report is transmitted to a scheduler, such as an eNB, the eNB may already have received multiple CSI-RS reports corresponding to the same CSI-RS index. This may thereby reduce the outage probability that can be caused by CSI-RS index error.

Figure 10:
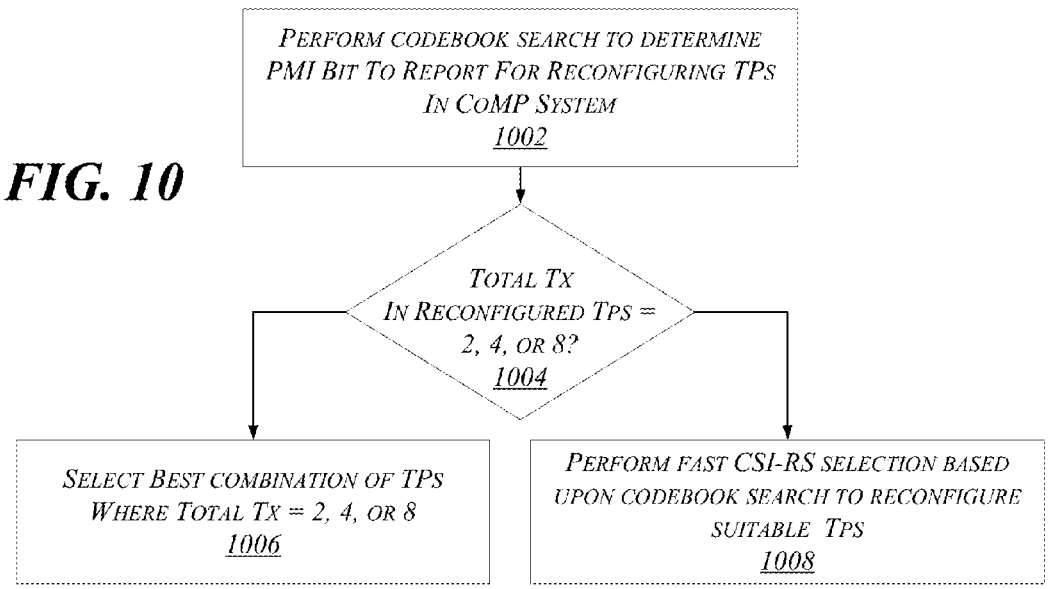
FIG. 10 depicts a further embodiment of a logic flow.

FIG. 10 depicts another embodiment of a logic flow 1000. At block 1002 a codebook search is performed to determine a PMI bit to report in an uplink transmission. The codebook may be an expanded codebook as discussed above, wherein the PMI bit is arranged to reconfigure the TPs serving a UE in a CoMP architecture. At block 1004, a determination is made as to whether the total number of transmitters in the reconfigured TPs is equal to 2, 4 or 8. If so, the flow moves to block 1008, where fast CSI-RS selection is performed based upon the codebook search in order to reconfigure suitable TPs to serve the UE. If the total number of TPs is not 2, 4, or 8, the flow moves to block 1006. At block 1006, the best combination of TPs is selected that satisfies the criterion in which the total number of transmitters is 2, 4, or 8.

Figure 11:
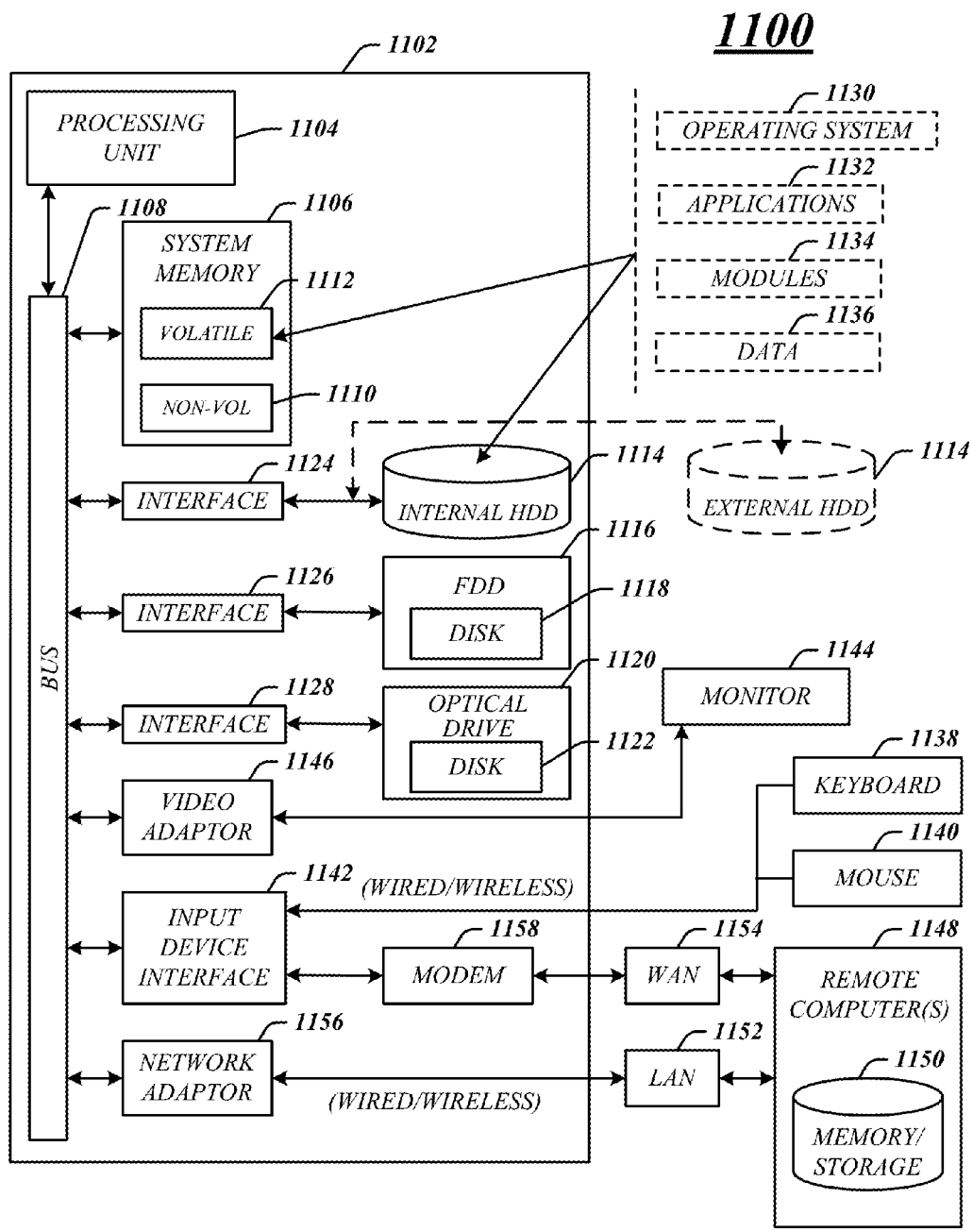
FIG. 11 illustrates an embodiment of an exemplary computing architecture suitable for implementing various embodiments.

FIG. 11 illustrates an embodiment of an exemplary computing architecture 1100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1194 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1194 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
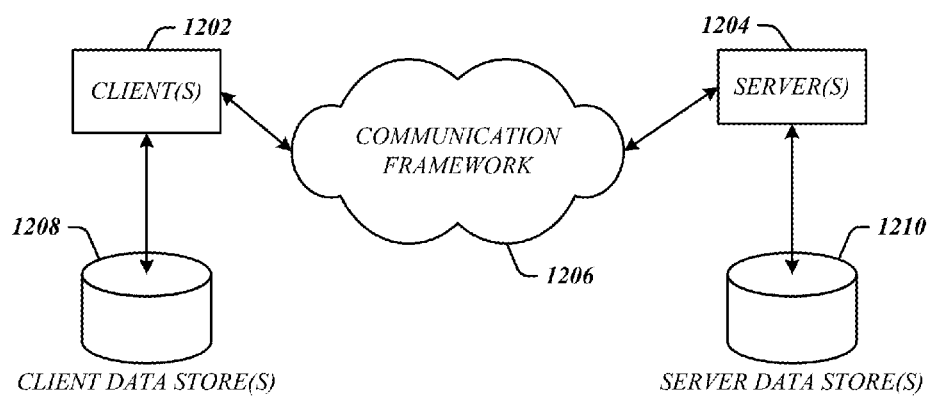
FIG. 12 illustrates a block diagram of an exemplary communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, and so forth. The embodiments, however, are not limited to implementation by the communications architecture 1200.

As shown in FIG. 12, the communications architecture 1200 comprises includes one or more clients 1202 and servers 1204. The clients 1202 may implement the client systems 310, 400. The servers 1204 may implement the server system 330. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols, such as those described with reference to system 1100. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Figure 13:
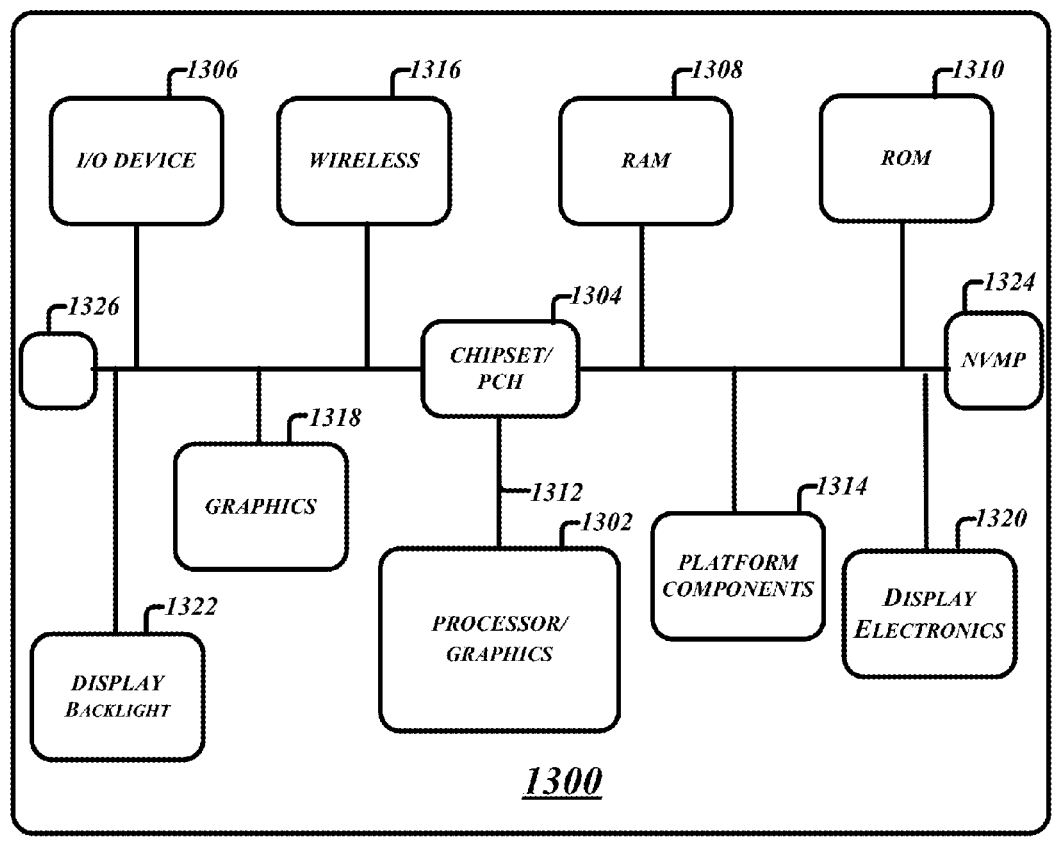
FIG. 13 is a diagram of an exemplary system embodiment.

FIG. 13 is a diagram of an exemplary system embodiment and in particular, FIG. 13 is a diagram showing a platform 1300, which may include various elements. For instance, FIG. 13 shows that platform (system) 1310 may include a processor/graphics core 1302 which may include an applications processor, a chipset/platform control hub (PCH) 1304, an input/output (I/O) device 1306, a random access memory (RAM) (such as dynamic RAM (DRAM)) 1308, and a read only memory (ROM) 1310, display electronics 1320, display backlight 1322, non-volatile memory port (NVMP) 1324, antenna 1326 and various other platform components 1314 (e.g., a fan, a crossflow blower, a heat sink, DTM system, cooling system, housing, vents, and so forth). System 1300 may also include wireless communications chip 1316 and graphics device 1318. The display electronics may include a liquid crystal display (LCD) screen, touch screen display, or other display. The I/O device 1306 may include a keyboard, mouse, and/or speakers. The embodiments, however, are not limited to these elements.

As shown in FIG. 13, I/O device 1306, RAM 1308, and ROM 1310 are coupled to processor 1302 by way of chipset 1304. Chipset 1304 may be coupled to processor 1302 by a bus 1312. Accordingly, bus 1312 may include multiple lines.

Processor 1302 may be a central processing unit comprising one or more processor cores and may include any number of processors having any number of processor cores. The processor 1302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1302 may be multiple separate processors located on separate integrated circuit chips. In some embodiments processor 1302 may be a processor having integrated graphics, while in other embodiments processor 1302 may be a graphics core or cores.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a memory;
a processor coupled to the memory, the processor to:
evaluate channel state information for a multiplicity of transmission points; and
select a channel state information reference signal (CSI-RS) to be measured in order to determine CSI; and
a wireless transceiver operative to transmit a CSI-RS indication during a portion of an uplink sub-frame allotted for transmitting CSI, the portion to comprise a portion allocated for hybrid automatic repeat request acknowledgment (HARQ-ACK) signaling, the CSI-RS indication to identify the selected CSI-RS.

2. The apparatus of claim 1, the wireless transceiver further arranged to transmit the CSI-RS indication in an uplink control channel using an uplink control channel format that specifies inclusion of a CSI-RS selection in an $11^{th}$ symbol of the uplink sub-frame.

3. The apparatus of claim 1, the processor to schedule reporting of the selected CSI-RS a first sub-frame when a HARQ-ACK message is to be scheduled in a second sub-frame, different from the first sub-frame.

4. The apparatus of claim 1, the processor to select the CSI-RS for a CSI-RS period having a same duration as a rank indicator (RI) period for sending a rank indicator (RI) signal that specifies a number of layers to be used for transmission via spatial multiplexing between the apparatus and one or more transmission points.

5. The apparatus of claim 4, the transceiver being arranged to transmit multiple reports of the selected CSI-RS during the CSI-RS period.

6. The apparatus of claim 4, the processor to provide an offset between the CSI-RS period and the RI period.

7. An apparatus, comprising:
a memory;
a processor coupled to the memory, the processor to select a channel state information reference signal (CSI-RS) to be measured in order to determine CSI; and
one or more transmitters arranged to wirelessly transmit a precoding matrix indicator (PMI) report to one or more transmission points in a wireless network, the PMI report to indicate the selected CSI-RS.

8. The apparatus of claim 7, the processor to select a PMI based on a codebook that includes CSI-RS selection code words, the PMI report to indicate the selected PMI.

9. The apparatus of claim 8, the PMI report to comprise a PMI bit indicating the selected CSI-RS.

10. The apparatus of claim 9, the codebook comprising a non-constant modulus vector.

11. The apparatus of claim 7, the apparatus being arranged to communicate with a total of 2, 4, or 8 transmitters located in the one or more transmission points.

12. An article comprising a non-transitory computer-readable storage medium containing instructions that, when executed at user equipment (UE), cause the UE to:
select one or more transmission points (TPs) to serve the UE;
identify a channel state information reference signal (CSI-RS) associated with the one or more TPs; and
transmit a precoding matrix indicator (PMI) report specifying a precoding matrix to be applied by the one or more TPs, the PMI report to indicate the CSI-RS.

13. The article of claim 12, the PMI report to comprise a CSI-RS selection code word selected from a codebook.

14. The article of claim 12, the codebook to comprise one or more non-constant modulus vectors.

15. The article of claim 14, the codebook to comprise a vector having the form $[1100]^T$ in a rank 1 4×1 codebook.

16. The article of claim 12, the non-transitory computer-readable storage medium containing instructions that, when executed at the UE, enable the UE to:
determine a total number of transmitters provided by the selection of the one or more TPs; and
adjust the selection of TPs if the total number of transmitters does not match a specified value set.

17. The article of claim 12, the non-transitory computer-readable storage medium containing instructions that, when executed at the UE, enable the UE to adjust the selection of TPs to provide a total number of transmitters equal to 2, 4 or 8.

18. An apparatus, comprising:
a memory;
a processor coupled to the memory, the processor to select a channel state information reference signal (CSI-RS) to be measured in order to determine CSI; and
one or more transmitters to transmit a report over a physical uplink control channel (PUCCH) to one or more transmission points in a wireless network, the report to indicate the selected CSI-RS and a rank indicator (RI) that specifies a number of layers to be used for transmission via spatial multiplexing between a user equipment UE and one or more transmission points.

19. The apparatus of claim 18, the uplink control channel supporting a multiplicity of mode states, each mode state specifying a unique combination of number of antenna ports and number of spatial multiplexing layers employed between the UE and one or more multiple transmission points.

20. An article comprising a non-transitory computer-readable storage medium containing instructions that when executed by a processor enable a system to:
direct a transmitter to send a rank indicator in a first report of an uplink control channel that links a user equipment (UE) and one or more transmission points of a wireless network; and
direct the transmitter to send a selection of channel state information reference signal (CSI-RS) in the first report.

21. The article of claim 20, the non-transitory computer-readable storage medium containing instructions that when executed by the processor enable the system to direct the transmitter to transmit the first report in an uplink control channel format that supports periodic transmission of both the CSI-RS and RI in a same sub-frame.

22. The article of claim 20, the non-transitory computer-readable storage medium containing instructions that when executed by the processor enable the system to direct transmission of the first report in one of a multiplicity of mode states, each mode state specifying a unique combination of number of antenna ports and number of spatial multiplexing layers employed between the UE and one or more multiple transmission points.

* * * * *